United States Patent
Olsen et al.

(10) Patent No.: US 11,854,377 B2
(45) Date of Patent: Dec. 26, 2023

(54) FIELD INSTALLABLE LIGHT CURTAIN SIDE STATUS MODULE

(71) Applicant: Banner Engineering Corp., Minneapolis, MN (US)

(72) Inventors: Nick Olsen, Minneapolis, MN (US); William Theunissen, Minneapolis, MN (US); Charles Dolezalek, Stacy, MN (US); Scott Eliason, Minneapolis, MN (US); John Klesk, Minneapolis, MN (US); Matthew Michael Gelineau, Minneapolis, MN (US); Dean Erickson, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 17/823,312

(22) Filed: Aug. 30, 2022

(65) Prior Publication Data

US 2023/0064404 A1    Mar. 2, 2023

Related U.S. Application Data

(60) Provisional application No. 63/260,728, filed on Aug. 30, 2021.

(51) Int. Cl.
| | |
|---|---|
| G08B 5/36 | (2006.01) |
| G01V 8/20 | (2006.01) |
| F16P 3/14 | (2006.01) |

(52) U.S. Cl.
CPC .................. *G08B 5/36* (2013.01); *F16P 3/14* (2013.01); *G01V 8/20* (2013.01)

(58) Field of Classification Search
CPC ................. G08B 5/36; G01V 8/20; F16P 3/14
See application file for complete search history.

(56) References Cited

U.S. PATENT DOCUMENTS

| | | |
|---|---|---|
| 5,302,942 A | 4/1994 | Blau |
| 6,124,586 A | 9/2000 | Coi |
| 6,297,498 B1 | 10/2001 | Shteynberg et al. |
| 6,414,603 B1 | 7/2002 | Yamaguchi et al. |

(Continued)

FOREIGN PATENT DOCUMENTS

| | | |
|---|---|---|
| CN | 201895235 U | 7/2011 |
| CN | 206876904 U | 1/2018 |
| JP | 2002124168 A | 4/2002 |

OTHER PUBLICATIONS

International Search Report and Written Opinion of the International Searching Authority in related International Application No. PCT/US2022/075677, dated Dec. 2, 2022, 12 pages.

(Continued)

*Primary Examiner* — John A Tweel, Jr.
(74) *Attorney, Agent, or Firm* — Craige Thompson; Thompson Patent Law; Timothy D. Snowden

(57) ABSTRACT

Apparatus and associated methods relate to a side-mounted field-installable indication module (SMFIIM) configured to reflect a status of a manufacturing area (e.g., a status of a machine, status of a light curtain). In an illustrative example, the SMFIIM may include a light emitting module configured to emit a visual indicium corresponding to the status of the manufacturing area, and a coupling member configured to be releasably captured within a longitudinally extending channel of a housing of a light curtain. After installation, for example, the SMFIIM may be disposed on a side of and substantially parallel to the housing. The light emitting module may emit the visual indicium in an emitting plane oriented at an angle less than 90° to a plane tangential to a mounting surface of the light curtain housing. Various embodiments may advantageously provide a wide viewing angle of the light emitting module around the lighting curtain.

20 Claims, 9 Drawing Sheets

(56) References Cited

U.S. PATENT DOCUMENTS

| | | |
|---|---|---|
| 6,710,325 B2 * | 3/2004 | Kuhar .................. G08B 13/183 |
| | | 359/821 |
| 6,982,839 B2 * | 1/2006 | Schuler ................... G01V 8/20 |
| | | 250/216 |
| 9,671,523 B2 | 6/2017 | Gelineau et al. |
| 9,870,681 B2 | 1/2018 | Gelineau et al. |
| 9,939,552 B2 * | 4/2018 | Meinherz ................. G01V 8/20 |
| 11,346,498 B1 | 5/2022 | Nair et al. |
| 2003/0029992 A1 | 2/2003 | Kudo et al. |
| 2007/0125938 A1 | 6/2007 | Kikuchi et al. |
| 2012/0267516 A1 | 10/2012 | Meinherz |
| 2013/0292554 A1 | 11/2013 | Meinherz et al. |
| 2017/0228991 A1 | 8/2017 | Gelineau et al. |
| 2019/0162741 A1 | 5/2019 | Newberg |

OTHER PUBLICATIONS

Wenglor, Quickstart Z99G0XX, LED indicator strip set, Wenglor, May 20, 2020, 1 page.
Chapter II Demand filed in related International Application No. PCT/US22/75677, dated Apr. 5, 2023, 17 pages
Written Opinion of the International Preliminary Examining Authority in related International Application No. PCT/US2022/075677, dated May 24, 2023, 8 pages.
Examiner Minutes in related International Application No. PCT/US2022/075677, dated Jul. 13, 2023, 6 pages.
Response to Intermediate Written Opinion During Proceedings Unter PCT Art. 31 (PCT Chapter II) and PCT Art. 34 Amendments, in related International Application No. PCT/US2022/075677, dated Jul. 24, 2023, 19 pages.

* cited by examiner

FIELD INSTALLABLE LIGHT CURTAIN SIDE STATUS MODULE

CROSS-REFERENCE TO RELATED APPLICATIONS

This application claims the benefit of U.S. Provisional Application Ser. No. 63/260,728, titled "Field Installable Light Curtain Side Status Module," filed by Nick Olsen, et al., on Aug. 30, 2021.

This application incorporates the entire contents of the foregoing application(s) herein by reference.

The subject matter of this application may have common inventorship with and/or may be related to the subject matter of the following:

- U.S. application Ser. No. 15/494,415, titled "Field Installable Light Curtain Status Module," filed by Matthew Michael Gelineau, et al., on Apr. 21, 2017, and issued as U.S. Pat. No. 9,870,681 on Jan. 16, 2018;
- U.S. application Ser. No. 14/819,264, titled "Field Installable Light Curtain Status Module," filed by Matthew Michael Gelineau, et al., on Aug. 5, 2015, and issued as U.S. Pat. No. 9,671,523 on Jun. 6, 2017; and
- PCT Application Ser. No. PCT/US16/45179, titled "Field Installable Light Curtain Status Module," filed by Matthew Michael Gelineau, et al., on Aug. 2, 2016.

This application incorporates the entire contents of the foregoing application(s) herein by reference.

TECHNICAL FIELD

Various embodiments relate generally to indicators.

BACKGROUND

Manufacturing facilities produce useful articles by processing components into finished goods. The operations used to process the components may involve transformational steps that change the article from one state to another. Some of these transformational operations employ machinery, such as presses, cutting tools, conveyor systems, ovens, or chemical applicators, for example.

Some manufacturing facilities use machinery that can be dangerous to humans. For example, a worker who walks into a zone of operation of a large robotic arm is at risk of serious bodily harm if the arm's motion profile intersects the worker's body or clothing. In another example, a worker who places a workpiece in a press and reaches into the press while the press is activated could be severely injured.

To promote safety for operators and machines, many manufacturing machines are protected, either partially or entirely surrounded by light curtain systems. A light curtain safety system may cause a machine to be deactivated when an object interrupts any portion of the light curtain sensing zone. For example, a hand extending through the curtain of light may block one or more beams of the light curtain, which the light curtain may interpret as a potential danger condition. The light curtain may typically respond by causing the machine to be deactivated by, for example, engaging a braking system and/or interrupting electric power to motor drives that cause a press to move. A light curtain safety system may also prevent a machine from being activated when an object is present in any portion of the light curtain sensing zone. For example, prior to machine startup, an operator who is standing too close, or within hazardous proximity, to a machine may block one or more beams of the light curtain. The light curtain may interpret this as a danger condition and prevent machine startup.

SUMMARY

Apparatus and associated methods relate to a side-mounted field-installable indication module (SMFIIM) configured to reflect a status of a manufacturing area (e.g., a status of a machine, status of a light curtain). In an illustrative example, the SMFIIM may include a light emitting module configured to emit a visual indicium corresponding to the status of the manufacturing area, and a coupling member configured to be releasably captured within a longitudinally extending channel of a housing of a light curtain. After installation, for example, the SMFIIM may be disposed on a side of and substantially parallel to the housing. The light emitting module may emit the visual indicium in an emitting plane oriented at an angle less than 90° to a plane tangential to a mounting surface of the light curtain housing. Various embodiments may advantageously provide a wide viewing angle of the light emitting module around the lighting curtain.

Various embodiments may achieve one or more advantages. For example, some embodiments may advantageously allow the SMFIIMs to be slidingly adjustable at the housing of the light curtain to adjust a height of the visual indicium.

Some embodiments, for example, may advantageously include a refractive cover (e.g., configured to provide a distributed 'glowing' effect over substantially an entire viewing portion of the cover) for the light emitting module to increase viewing angle of the visual indicium.

Some embodiments, for example, may advantageously include other functionality. For example, some embodiments may include input interfaces. Some embodiments may, for example, include sensors. Various such embodiments may, for example, provide customizable modular functionalities for interacting with a monitored area.

For example, some embodiments may advantageously provide cascade connectivity. Such embodiments may, for example, advantageously enable a length of the visual indicium to be extended. Some embodiments may, for example, advantageously enable multiple functionalities to be cascaded together.

Some embodiments may advantageously include, for example, a display array(s). The display array may, for example, provide icons, animations, texts, and/or other interpretation capabilities. For example, some embodiments provided with a sensor(s) and light(s) may advantageously warn an approaching user of an imminent risk of breaking a safety barrier (e.g., a light curtain) and interrupting a machine and/or process.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a side-mounted field-installable indication module (SMFIIM) is introduced with reference to FIGS. 1-6. Second, that introduction leads into a description with reference to FIG. 7 of some exemplary embodiments of cascaded side-mounted field-installable modules. Third, with reference to FIGS. 8-10, exemplary control systems for controlling the side mounted field installable modules are described in application to exemplary light curtain units. Finally, the document discusses further embodiments, exemplary applications and aspects relating to light curtain status indicators.

Figure 1:
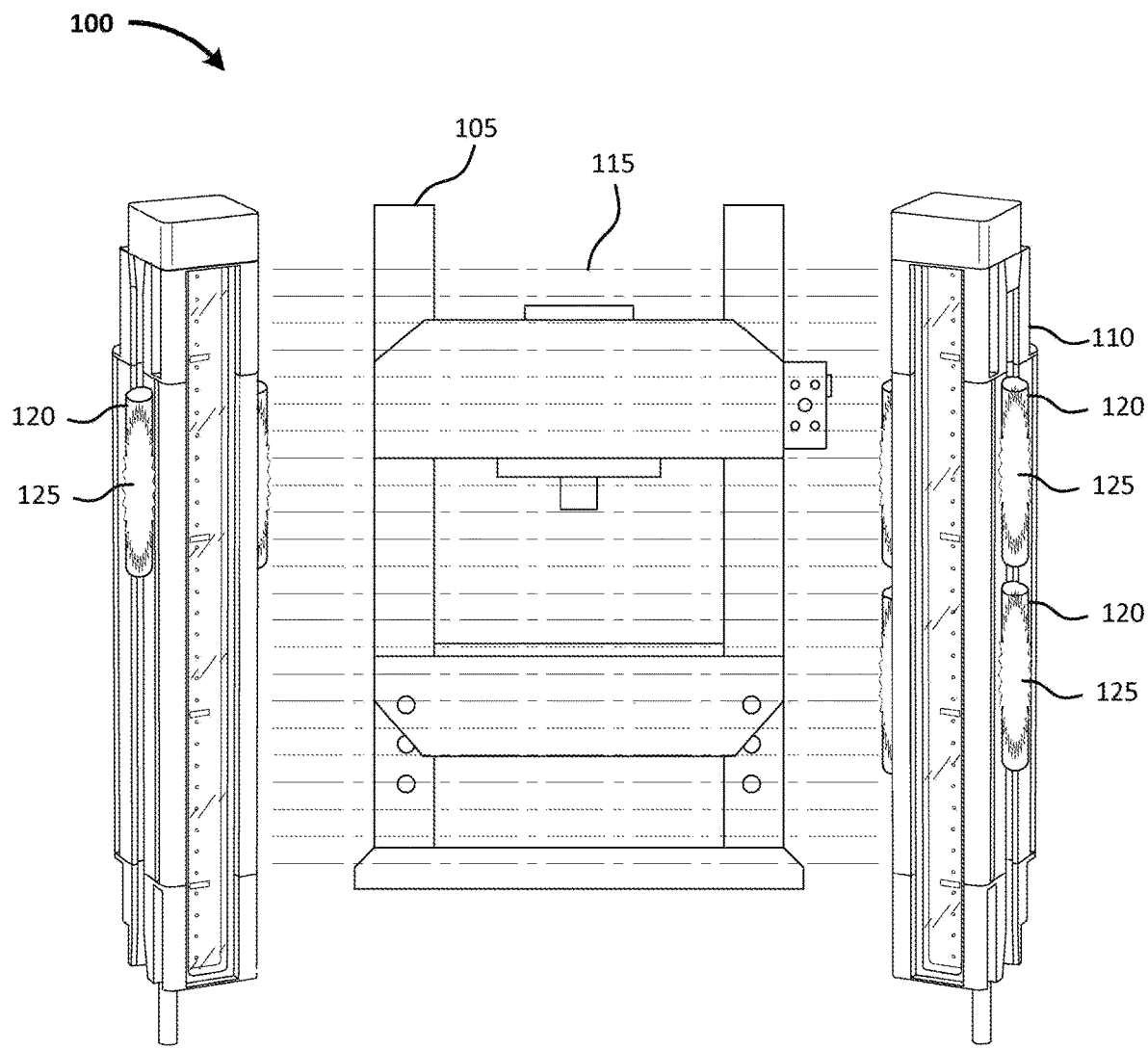
FIG. 1 depicts exemplary side-mounted field-installable indication modules (SMFIIM) depicted in an illustrative use-case scenario.

FIG. 1 depicts exemplary side-mounted field-installable indication modules (SMFIIM) depicted in an illustrative use-case scenario. In a depicted exemplary scenario 100, a machine 105 (e.g., a hydraulic press) is deployed (e.g., on a shop floor). The machine 105 may, for example, require safeguarding. An optoelectronic safety guard (e.g., pair of light curtains) is being installed to safeguard the machine 105. The optoelectronic safety guard includes two light curtain units 110. The two light curtain units 110 are configured to generate a curtain of light 115. Upon successful installation, the curtain of light 115 may, for example, be configured such that operation of the machine 105 is stopped upon interruption of the curtain of light 115.

SMFIIMs 120 are mounted, as depicted, on the light curtain units 110. In the depicted example, the SMFIIMs 120 are operated to emit indications 125. The indications 125 may, for example, indicate an operation state of the light curtain units 110. The indications 125 may, for example, indicate a state of the curtain of light 115 (e.g., muted, armed, check alignment, cleaning needed, weak signal). The indications 125 may, for example, indicate a state of the machine 105 (e.g., error state, operating state, dangerous, safe to load material, lockout). The indications 125 may, for example, indicate a state of the factory (e.g., in operation, in maintenance). In some implementations, the indications 125 may display a diagnostic of the light curtain units 110 (by turn up intensity, changing colors). For example, the indications 125 may change from red to yellow to green to indicate levels of optical alignment of the light curtain units 110.

The SMFIIMs 120 may, for example, be controlled by the two light curtain units 110. The SMFIIMs 120 may, for example, be controlled by an external controller (e.g., the machine 105, a PLC, a control unit). A more detailed discussion of controlling the light curtain units 110 and the SMFIIMs 120 is described with reference to FIGS. 8-10.

In some implementations, the SMFIIMs 120 may be slidingly adjustable along a longitudinal axis of a housing of the light curtain unit 110. For example, the SMFIIMs 120 may be installed at a height close to eye level for workers in a production floor to advantageously improve visibility of the indications 125. As shown in FIG. 1, one or more of the SMFIIMs 120 may be mounted. Accordingly, for example, a length of the indication 125 may be extended to be one unit long, two units long, or extending through the housing of the light curtain unit 110 entirely. For example, the total light output of the SMFIIMs 120 at a side of the light curtain unit 110 may be increased. In some implementations, multiple SMFIIMs 120 may be configured to emit an indication with different animations to represent various status of the machine 105 or the light curtain units 110. For example, the SMFIIMs 120 may display different colors (e.g., in multiple independently addressable segments) at the same time that may represent a color coded message. In some examples, when the SMFIIMs 120 are mounted to an entire length of the light curtain unit 110, different colors of the indications 125 may represent areas where the light curtain unit 110 are currently being muted, and areas where the light curtain unit 110 are currently being activated.

In some implementations, the SMFIIMs 120 may include a 'glowing' (e.g., refractive) cover (e.g., a plastic light permissible cover) over the indications 125. For example, the glowing cover may refract an emitted light from the SMFIIMs 120 so that a wide angle (e.g. at least 180°, 225°, 270°) of the indications may be visible around the mounted light curtain unit 110.

In some implementations, the indications 125 may include a display grid. For example, the display grid may be configured to display icons, text, and interpretations of status. In some examples, the display grid may assist in troubleshooting help (e.g., aid in alignment of the light curtain unit 110). For example, the display grid may display a bar graph that increase in height as an alignment of the light curtain units 110 improves.

In the depicted example, the SMFIIMs 120 are operated at each side of the light curtain unit 110. In some examples, having SMFIIMs 120 mounted on both sides of the light curtain unit 110 may advantageously provide a 360° viewing of the indications 125 around the housing of the light curtain unit 110.

Figure 2:
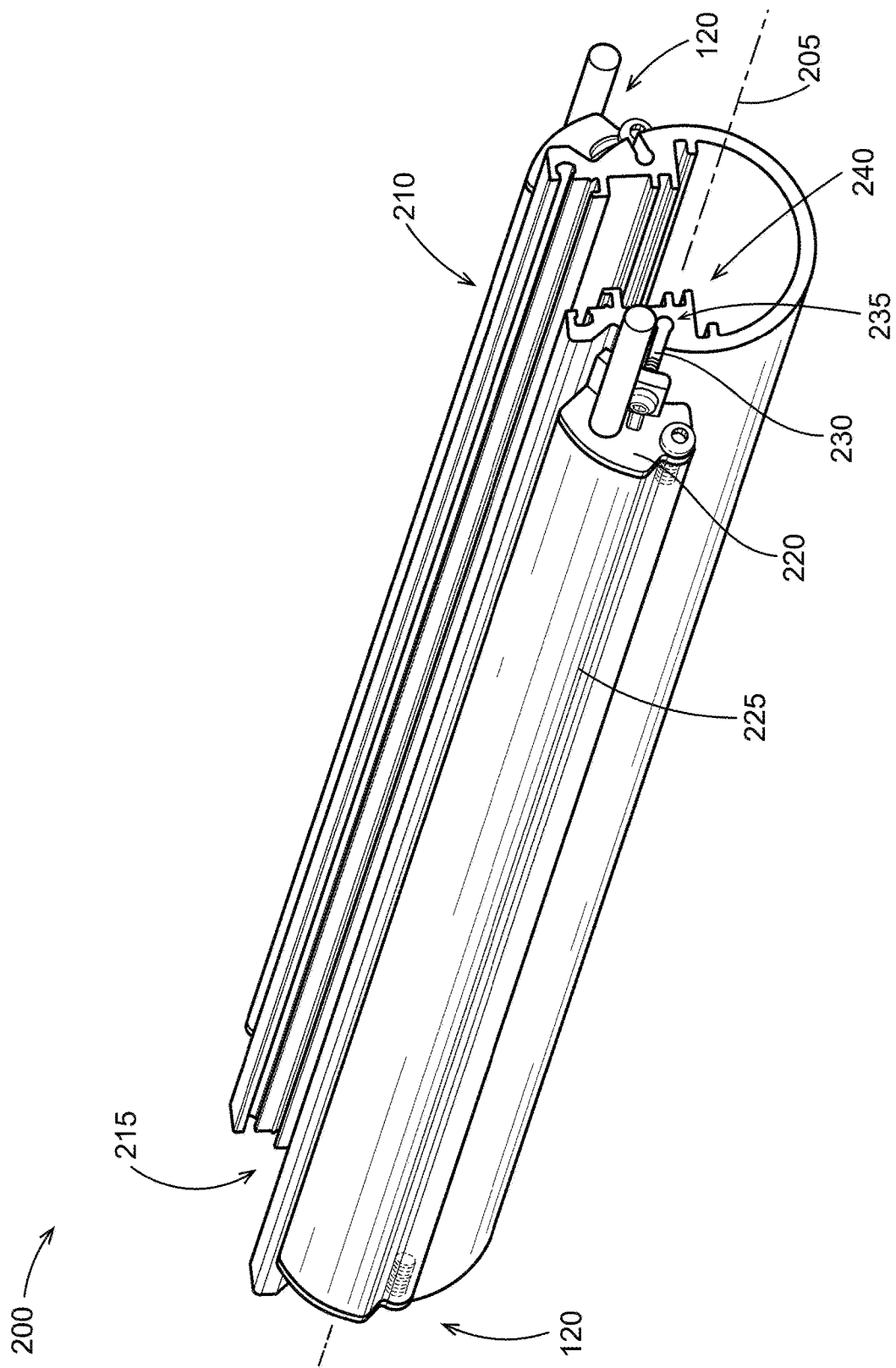
FIG. 2 and FIG. 3 depict exemplary SMFIIMs mounted on an exemplary light curtain housing.
Figure 3:
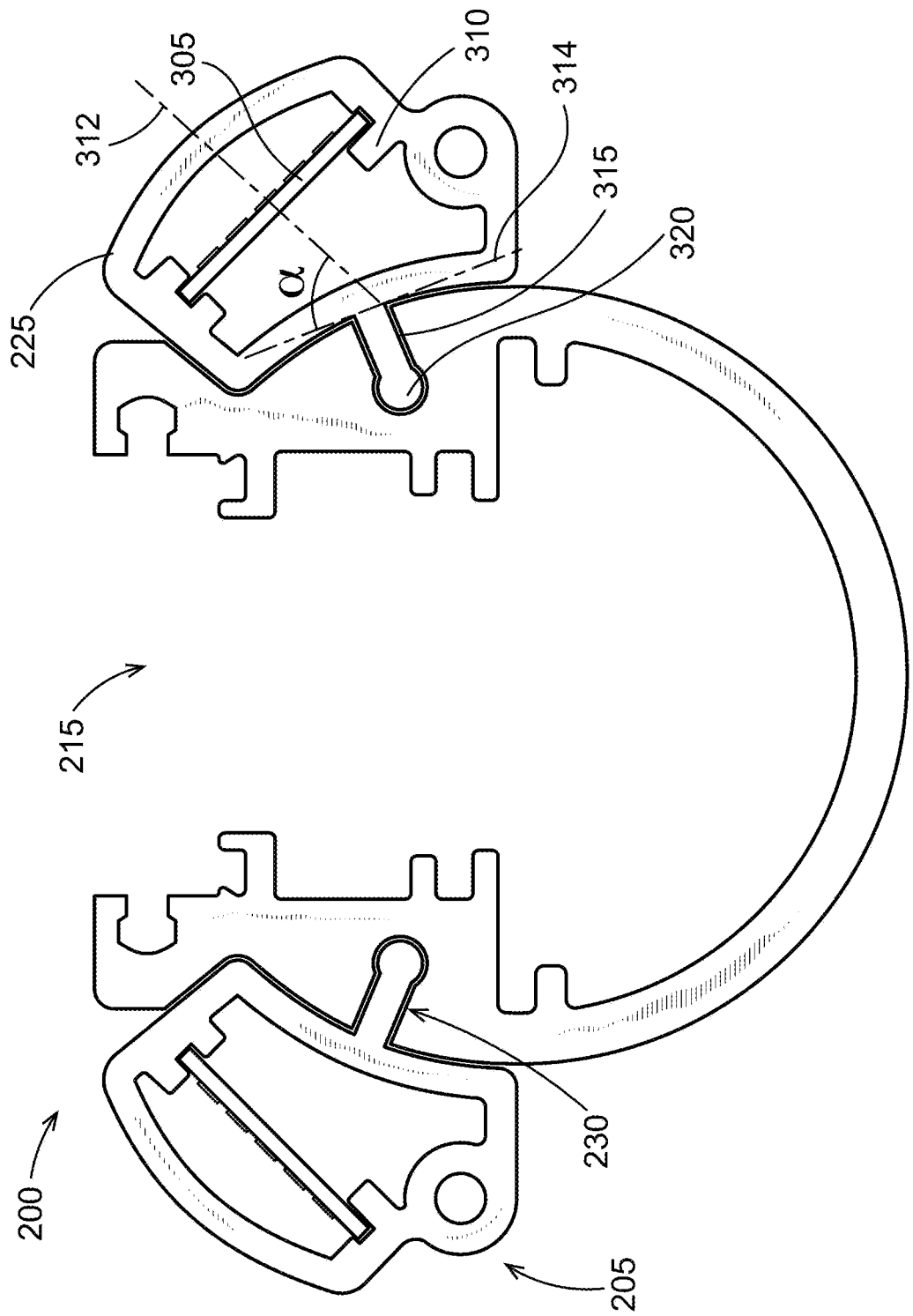

FIG. 2 and FIG. 3 depict exemplary SMFIIMs mounted on an exemplary light curtain housing. A longitudinal light curtain housing and indicator assembly 200 is depicted. An SMFIIM 120 is mounted on each side of a light curtain housing 210 along a longitudinal axis 205. The light curtain housing 210 may, for example, be constructed as an extrusion. The light curtain housing 210 may, for example, include plastic. The light curtain housing 210 may, for example, include aluminum.

The light curtain housing 210 is provided with a longitudinally extending aperture 215 (having a width as shown). The longitudinally extending aperture 215 defines an opening into a cavity 240 defined by the light curtain housing 210. Light curtain circuitry may, for example, be disposed in the cavity 240 and/or the longitudinally extending aperture 215.

Each of the SMFIIM 120 is mounted substantially parallel to the longitudinal axis of the light curtain housing 210. The SMFIIM 120 includes a base 220. To the base 220 is coupled a cover 225. The cover 225 may, for example, be at least partially optically translucent. The cover 225 may, for example, be glowing and refracting light into a wide angle.

The SMFIIM 120 is provided with a longitudinally extending mounting member 230. The mounting member 230 extends substantially perpendicularly away from a surface of the SMFIIM 120 configured to face the light curtain housing 210. The longitudinally extending mounting member 230 releasably couples within a longitudinally extending channel 235 in the light curtain housing 210. Accordingly, the SMFIIM 120 may be advantageously releasably coupled to the light curtain housing 210.

As depicted in FIG. 3, the SMFIIM 120 includes a circuit board 305. The circuit board 305 may, for example, include at least one light-emitting element. In some embodiments the circuit board 305 may, for example, include at least one array of light-emitting elements. The light-emitting elements may, for example, include light-emitting diodes (LEDs). The array(s) of light-emitting elements may, for example, include linear arrays. The arrays may, for example, extend longitudinally along the circuit board such that, when the SMFIIM 120 is coupled to the 210, the arrays are oriented substantially parallel to the longitudinal axis of the light curtain housing 210.

In the depicted example, the cover 225 is a unitary housing. The unitary housing may, for example, be formed as a linear extrusion. The cover 225 includes mounting features 310. The mounting features may, for example, releasably couple to the circuit board 305. In the depicted example, the mounting features are arranged such that an optical axis 312 of the light-emitting elements of the circuit board 305 is oriented at an angle α relative to a plane 314 tangential to a mounting surface of the light curtain housing 210. The α, as depicted, may be less than 90 degrees. Accordingly, the SMFIIM 120 may, by way of example and not limitation, be advantageously mounted on a side of the light curtain housing 210 while still being visible from a front of the light curtain housing 210 (e.g., from an optical axis along an emission plane of the light curtain, extending from a center of the light curtain housing 210 through a center of the width of the longitudinally extending aperture 215 and substantially parallel to the longitudinal axis).

The longitudinally extending mounting member 230 includes a rib 315 extending longitudinally. The rib 315 extends distally away from a mounting surface of the cover 225. The longitudinally extending mounting member 230 may, for example, be a retention member configured to be inserted into the longitudinally extending channel 235. The longitudinally extending mounting member 230 may, for example, be configured to assemble to the light curtain housing 210 in response to application of a force perpendicular to a tangential of a surface of the light curtain housing 210. In the depicted example, a distal coupling member 320 is provided, extending longitudinally along a distal end of the rib 315.

The longitudinally extending mounting member 230 is configured to releasably couple to the longitudinally extending channel 235. The longitudinally extending channel 235 includes an opening (e.g., opening 325 disclosed at least with reference to FIG. 3 of U.S. Provisional Application 63/260,728, referred to herein as the '728 application and incorporated herein by reference). The opening may, for example, have a width W (e.g., 2 mm, 5 mm, 10 mm, 20 mm, 30 mm, wider). The opening may transition to a restriction (e.g., restriction 330 disclosed at least with reference to FIG. 3 of the '728, application) having a width W1<W. The restriction may open into a channel (e.g., channel 335 disclosed at least with reference to FIG. 3 of the '728, application) having a width (e.g., diameter) W2>W>W1. The distal coupling member may, for example, be configured to be releasably captured within the channel. The distal coupling member may, for example, be configured to be (substantially elastically) compressed to pass through the when inserted radially thereinto and then expand (e.g., substantially elastically) once within the channel. Accordingly, the SMFIIM 120 may be advantageously coupled to the light curtain housing 210 by the longitudinally extending mounting member 230 engaging the longitudinally extending channel 235.

The longitudinally extending mounting member 230 may, for example, prevent rotation of the SMFIIM 120 relative to the light curtain housing 210. Accordingly, for example, a user may advantageously position the lights freely up or down along a longitudinal axis of the light curtain housing 210.

Figure 4:
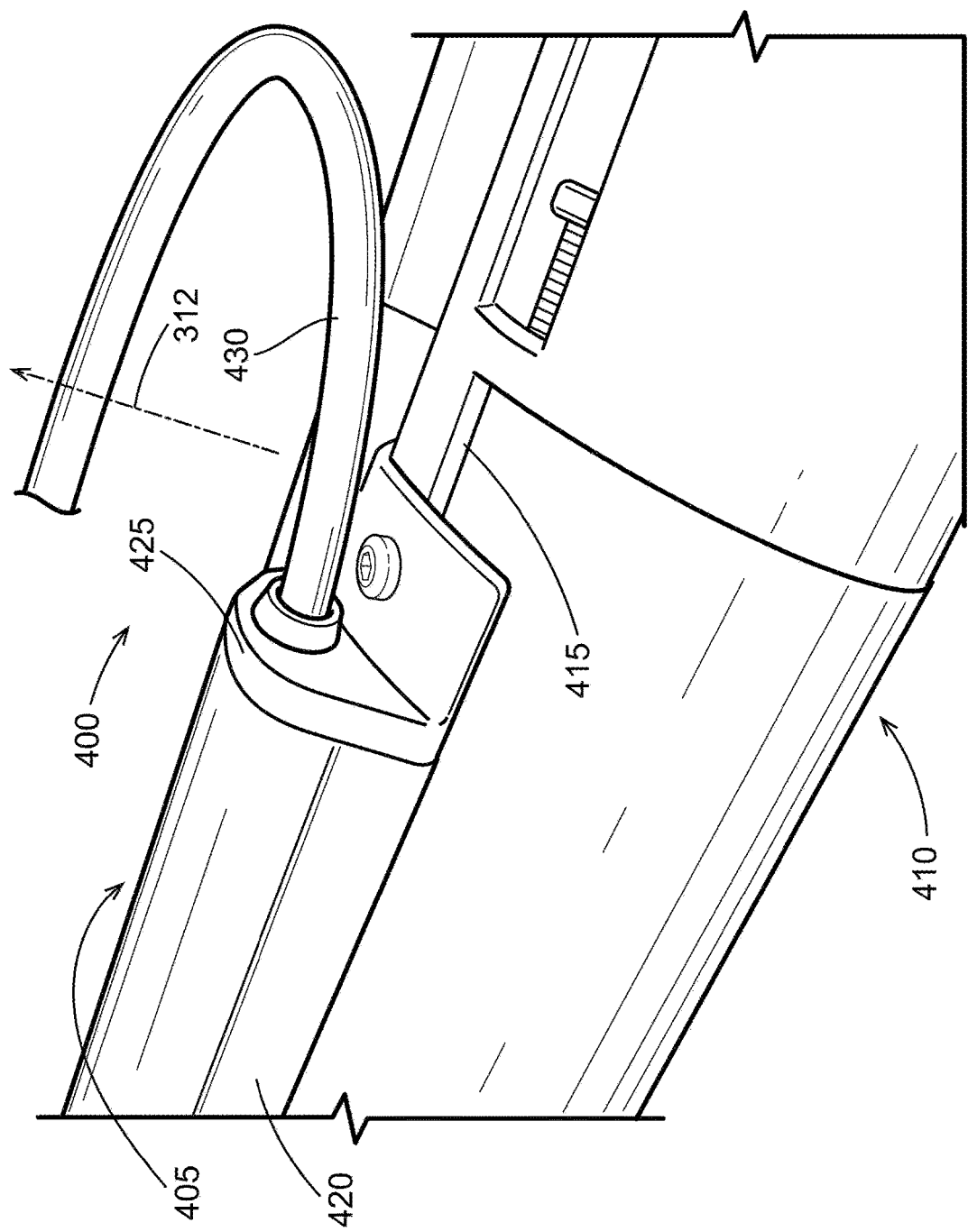
FIG. 4 shows an exemplary SMFIIM mounted on an exemplary light curtain housing.

FIG. 4 shows an exemplary SMFIIM mounted on an exemplary light curtain housing. An exemplary side-indicator light curtain system 400 includes an SMFIIM 405 mounted on a light curtain 410. The light curtain 410 includes a longitudinally extending channel 415. The SMFIIM 405 is releasably coupled to the light curtain 410 by insertion of a retaining member (not shown) (e.g., such as the rib 315) into the longitudinally extending channel 415.

The SMFIIM 405 includes a unitary linear extrusion body 420 coupled to a base 425. Light-emitting elements (not shown) of the SMFIIM 405 are provided power and/or command signals by a cable 430 (e.g., coupled to the light curtain 410, coupled to a separate power and/or command source). As depicted, a fastening member (e.g., screw) may be inserted through the base 425 to engage the longitudinally extending channel 415. The fastening member may, for example, prevent movement of the SMFIIM 405 along the longitudinal axis relative to the light curtain 410.

Figure 5:
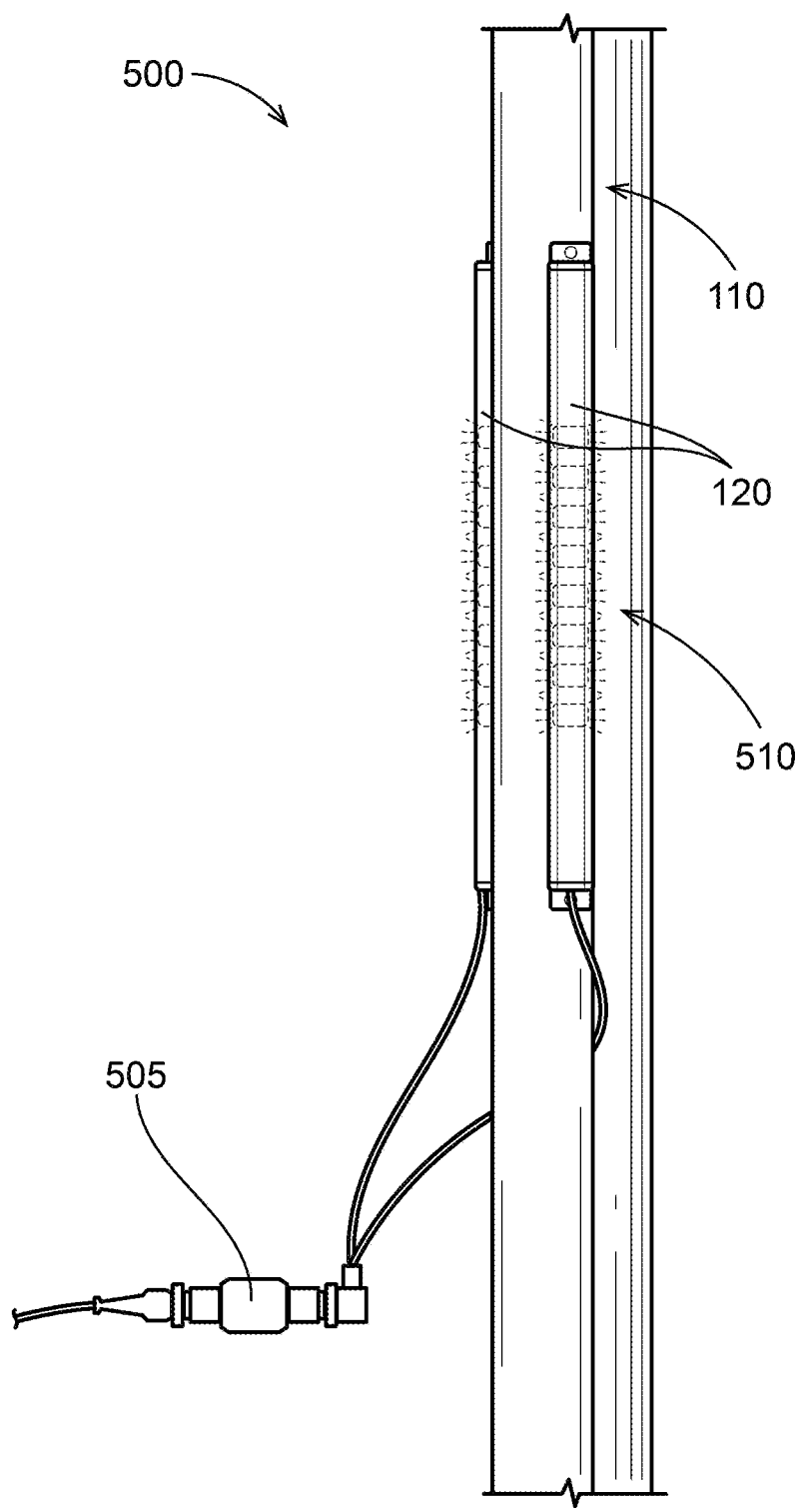
FIG. 5 and FIG. 6 depict an exemplary SMFIIM deployed in an exemplary use-case scenario.
Figure 6:
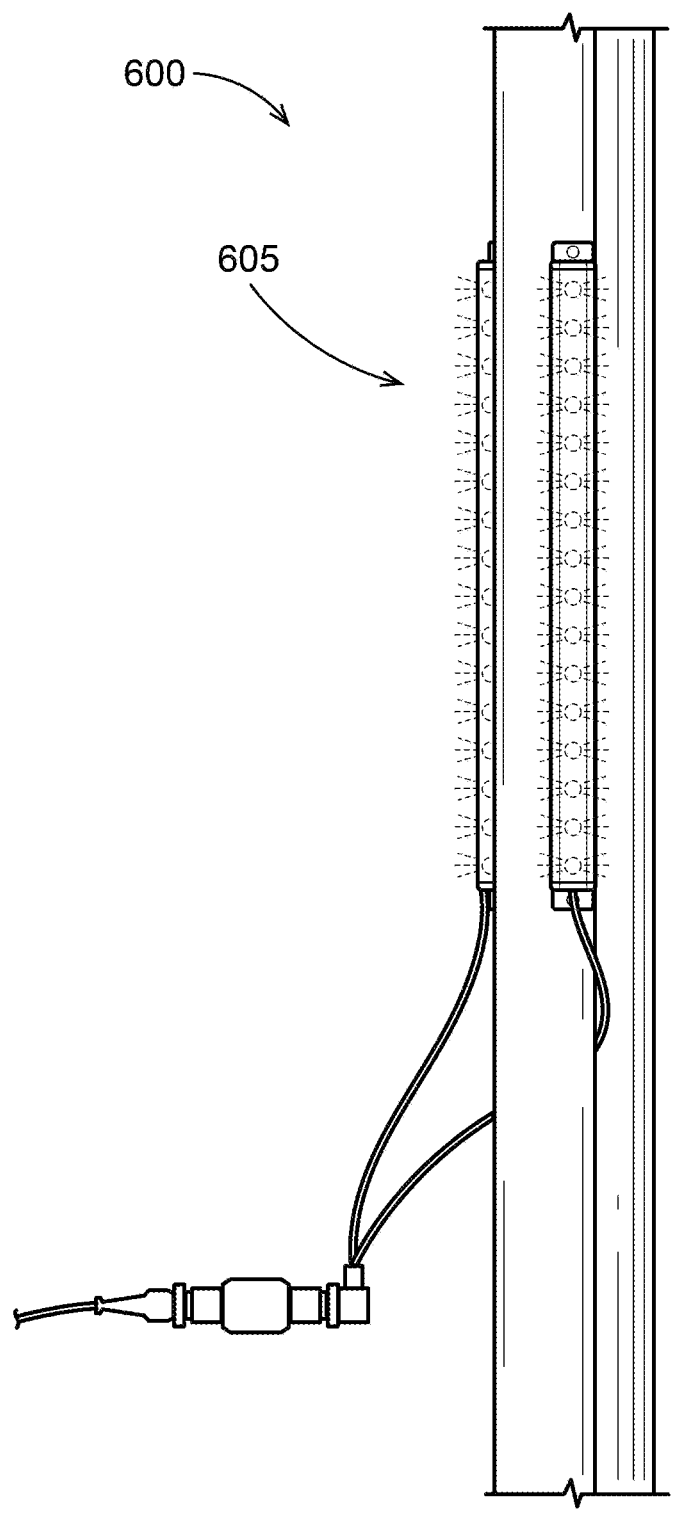

FIG. 5 and FIG. 6 depict an exemplary SMFIIM deployed in an exemplary use-case scenario. As shown in FIG. 5, two SMFIIMs 120 are mounted on the light curtain unit 110. In this example, the SMFIIMs 120 are connected to a central hub 505 for control. In this scenario 500, a first indication 510 (e.g., the light curtain is not armed, and workers can pass through) is displayed at the SMFIIMs 120. As shown in FIG. 6, a scenario 600 indicates that a second indication 605 is displayed at the SMFIIMs 120. For example, the second indication 605 may indicate that a machine behind the light curtain is armed. For example, it may be hazardous to pass through the light curtain 110 at this time.

Figure 7:
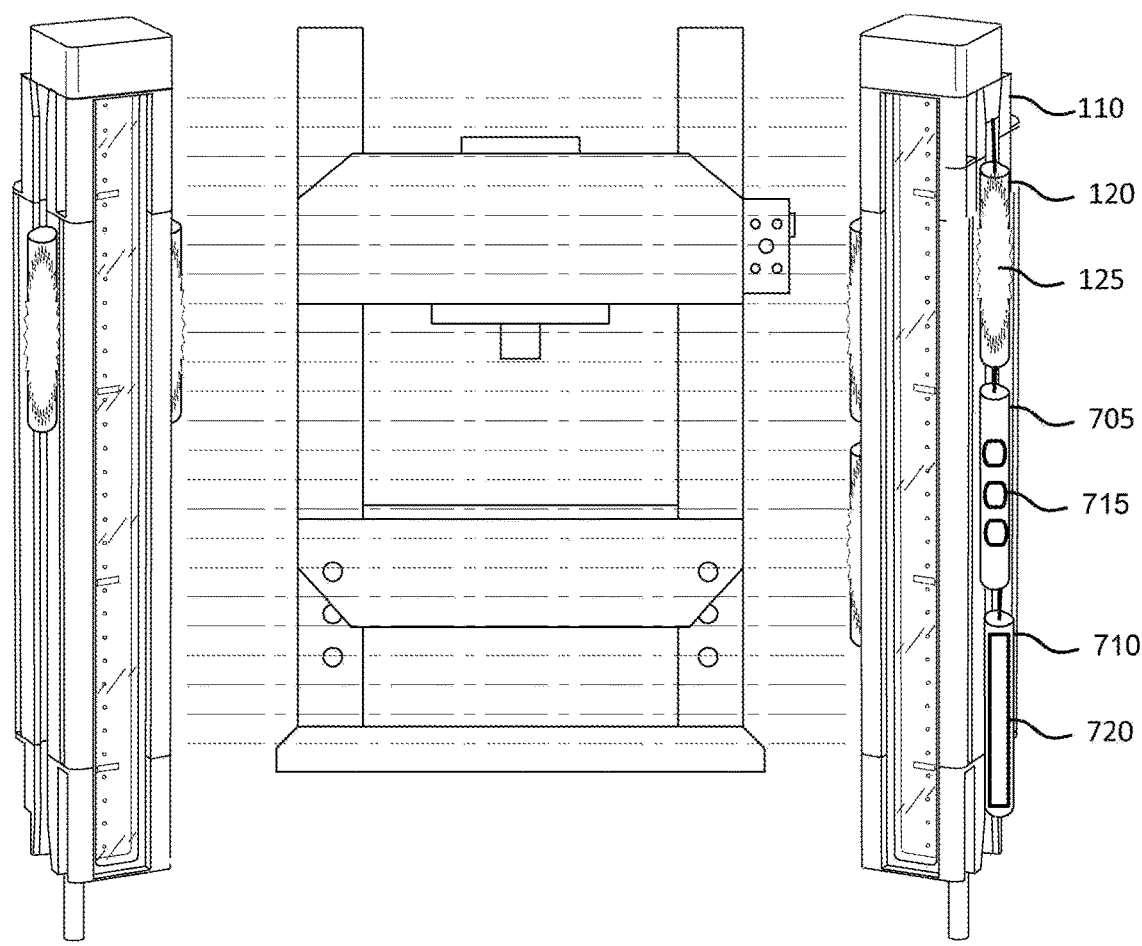
FIG. 7 depicts exemplary cascaded side-mounted field-installable modules (CSMFIMs) depicted in an illustrative use-case scenario.

FIG. 7 depicts exemplary different types of cascaded side-mounted field-installable modules (CSMFIMs) depicted in an illustrative use-case scenario 700. In this example, the light curtain unit 110 is mounted with the SMFIIM 120, a side mounted input module (SMIM 705), and a side mounted sensing module (SMSM 710). As shown, the SMFIIM 120, the SMIM 705, and the SMSM 710 are serially connected to the light curtain unit 110. For example, the SMFIIM 120, the SMIM 705, and the SMSM 710 may receive power from the light curtain unit 110 cascadingly. In some implementations, the SMFIIM 120, the SMIM 705, and the SMSM 710 may be parallelly connected to a hub (for electrical power, control).

The SMIM 705 includes an input interface 715. For example, the input interface 715 may be a touch input (e.g., a capacitive touch input). For example, the input interface 715 may include push buttons. The input interface 715 may, for example, include sliding inputs. In some implementations, a user may use the input interface 715 to, for example, control the light curtain unit 110, the SMFIIM 120, the machine 105, or a combination thereof.

The SMSM 710 includes sensors 720. The sensors 720 may, for example, include light sensors. The sensors 720 may, for example, include temperature sensors. The sensors 720 may, for example, include distance sensors (e.g., a very low range time-of-flight sensor). In some implementations, the distance sensors may detect whether an object (e.g., a person, vehicles, other moving objects) is getting too close to possibly break the curtain of light 115. For example, the sensors 720 may transmit a signal to trigger the SMFIIM 120 to display (e.g., in changing the indication from green to amber) to advantageously provide an early warning before the curtain of light 115 is broken. For example, the early warning may advantageously prevent unnecessarily shutting down of the machine 105, causing production delays. In various implementations, the CSMFIM may advantageously provide a cost effective way to provide customizable functionality to the light curtain unit 110.

Figure 8:
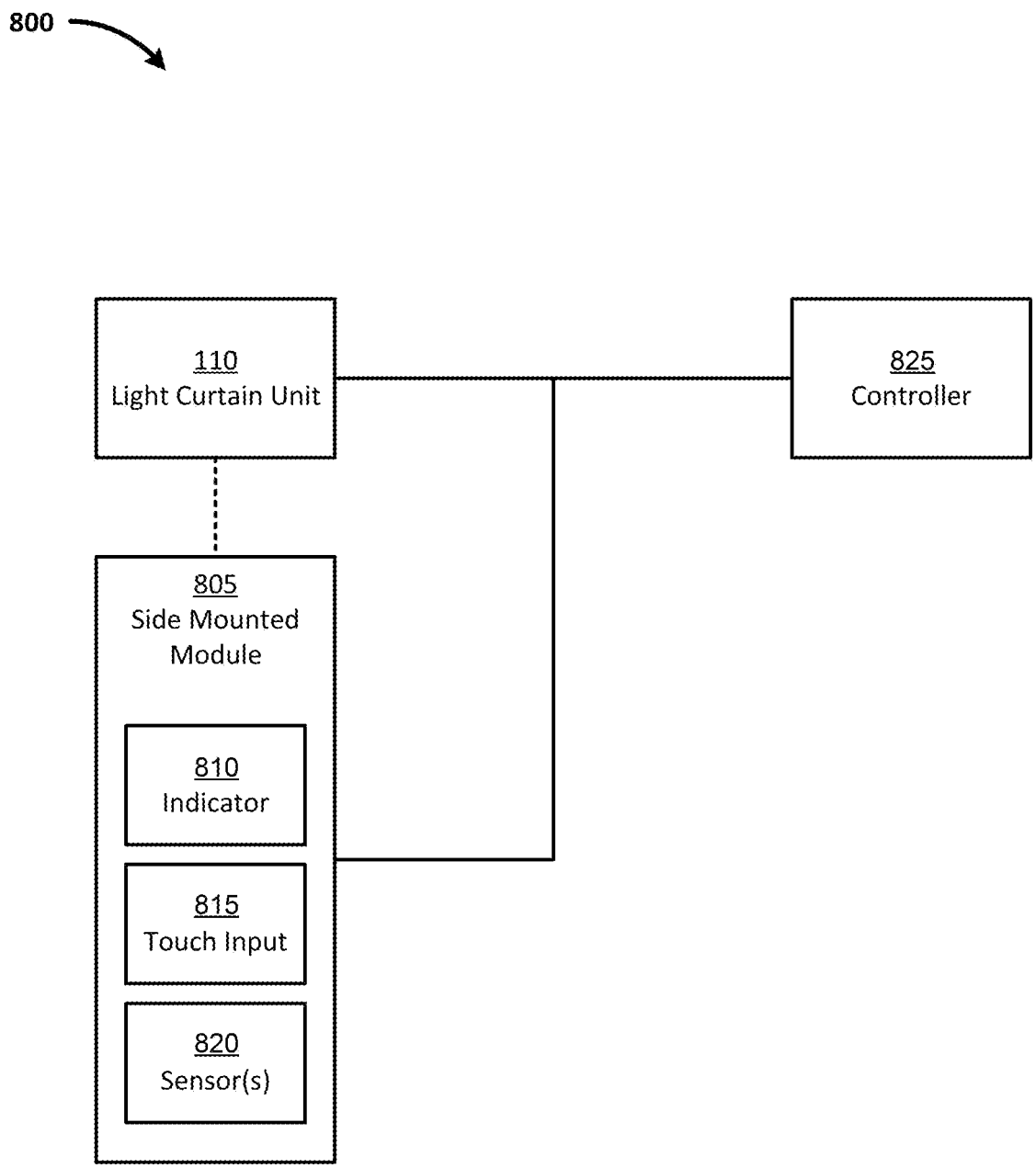
FIG. 8, FIG. 9, and FIG. 10 are block diagrams showing exemplary control circuits of exemplary side mounted modules.
Figure 9:
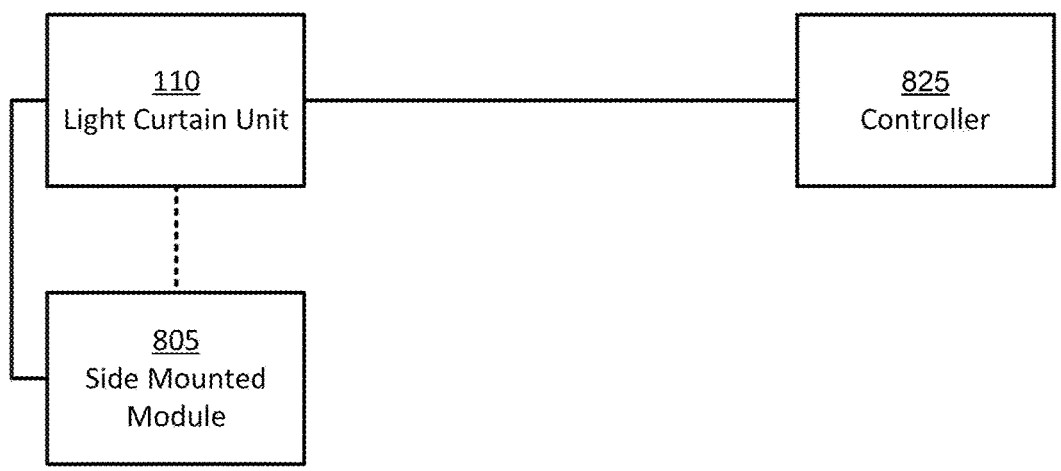
Figure 10:
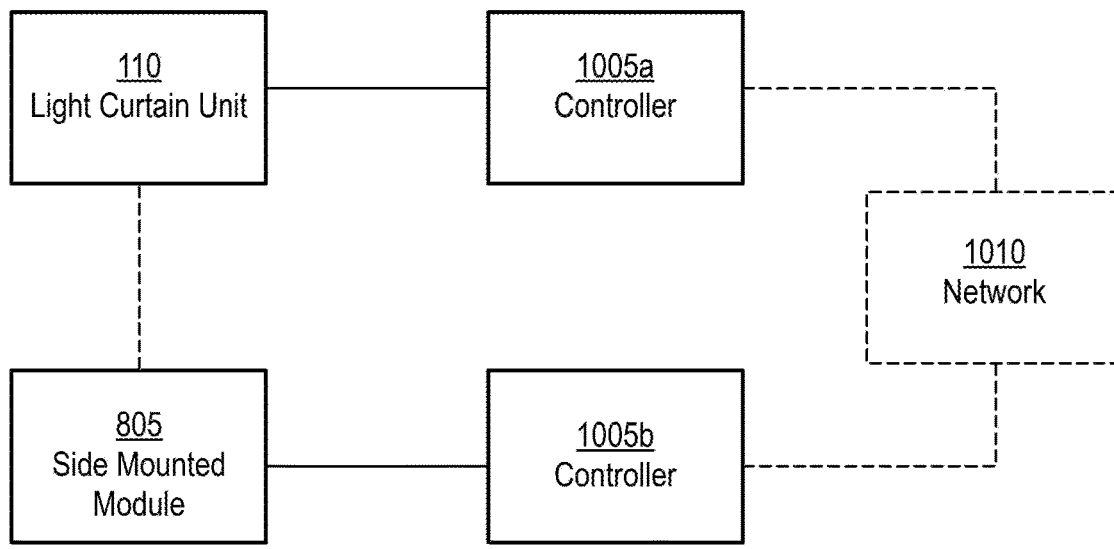

FIG. 8, FIG. 9, and FIG. 10 are block diagrams showing exemplary control circuits of exemplary side mounted modules. As shown in FIG. 8, a control system 800 includes the light curtain unit 110 and a side mounted module 805. The light curtain unit 110 is mechanically coupled to the side mounted module 805. The side mounted module 805 includes an indicator 810 (e.g., the SMFIIM 120), a touch input 815 (e.g., the SMIM 705), and sensors 820 (e.g., the SMSM 710). For example, the side mounted module 805 may be mounted to the light curtain unit 110 using mechanisms as described with reference to FIGS. 2-6.

In this example, the light curtain unit 110 and the side mounted module 805 are operably coupled to a controller 825. For example, the controller 825 may be a safety control network. For example, the controller 825 may be a network controlled by a safety PLC. In this example, the controller 825 may control both the light curtain unit 110 and the side mounted module 805. For example, the controller 825 may control the color of the indicator 810 based on a status of the light curtain unit 110. In some implementations, the controller 825 may also receive input (e.g., sensor input) from the side mounted module 805 and operate the light curtain unit 110 based on the received input (e.g., mute or arm the light curtain unit 110).

As shown in FIG. 9, the side mounted module 805 is connected to the light curtain unit 110 mechanically and operably. For example, the indicator 810 may be operated with an output signal switching device (OSSD) signal wire of the light curtain unit 110.

As shown in FIG. 10, a control system 1000 includes two independent controllers 1005a, 1005b. The light curtain unit 110 is connected to the controller 1005a. The side mounted module 805 is connected to the controller 1005b. As such, the light curtain unit 110 and the side mounted module 805 are coupled mechanically. For example, the light curtain unit 110 and the side mounted module 805 are controlled independently. In this example, the controllers 1005a, 1005b are optionally connected via a network 1010. For example, the network 1010 may coordinate smart customer applications with the controllers 1005a, 1005b.

Although various embodiments have been described with reference to the figures, other embodiments are possible. Although an exemplary system has been described with reference to the figures, other implementations may be deployed in other industrial, scientific, medical, commercial, and/or residential applications.

In some embodiments a system for a lighting bar may be designed for a wide-viewing angle. The system may, for example, include a lighting bar configurable to be removably attached by a user to a light curtain at a user-defined location.

Some embodiments may, for example, provide a method of providing illumination to a light curtain by releasably attaching a SMFIIM to it by applying an insertion force to the SMFIIM substantially perpendicular to a channel of the light curtain.

In some embodiments, a retention member of the SMFIIM may, for example, be replaceable (e.g., interchangeable for different sizes). In some embodiments a retention member of the SMFIIM may, for example, include a channel. The channel may, for example, releasably engage a rib. The rib may, for example, be releasably coupled to the light curtain. The rib may, for example, be integrally formed with the light curtain.

In some embodiments the SMFIIM may, for example, be configured to couple to a linear measuring device (e.g., measuring light curtain). In some embodiments the SMFIIM may, for example, be configured to releasably couple to linear extrusion (e.g., standard aluminum extrusions).

In various safety light curtain applications, highly visible indication of the light curtain status may be desirable. The highly visible indicators can be used to quickly and/or easily determine a status of the light curtain and/or minimize downtime of the guarded machine. In some cases, the indicators may be used to display information other than (e.g., in additional to, instead of) the light curtain status, such as a status of a warehouse floor. In various examples, the indicators need to be visible to personnel from a variety of angles and positions.

Various embodiments may include field-installable strip lights mounted to one or more sides of a safety light curtain sensor to provide bright illumination of an indication. The indication may, for example, correspond to a light curtain, warehouse, and/or machine status. The lights may be controlled directly by the light curtain. The lights may be controlled externally by a separate controller.

In some embodiments, internal printed circuit boards (PCBs) may, for example, be angled at approximately 45° to provide viewing from a variety of angles (e.g., α may be substantially 45°). In some embodiments an entire, molded plastic extrusion may be illuminated. Such embodiments may, for example, provide excellent viewing from multiple angles. For example, in some such embodiments, an emitted indication may be visible even from behind the light curtain.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a light curtain status indicator may include a light emitting module (e.g., 305). The light emitting module may include a refractive cover. The light emitting module may be configured to emit a visual indicium (e.g., 125) at a wide angle corresponding to a status of at least one predetermined signal. The light curtain status indicator may include a coupling member (e.g., 230) configured to be releasably captured within a longitudinally extending channel (e.g., 235) of a housing of a light curtain (e.g., 110), such that the light curtain status indicator is disposed on a side of and substantially parallel to the housing. The light emitting module may emit the visual indicium in an emitting plane (e.g., 314) intersecting an optical axis (e.g., 312) of the light curtain. When the light curtain status indicator is releasably coupled to the housing, the emitting plane may be oriented at an angle $\alpha$ relative to a plane tangential to a mounting surface of the light curtain housing, and $\alpha<90°$, such that the light emitting module is viewable from at least a 180° viewing angle.

The light emitting module may include a longitudinally extending array of light emitters configured such that, when the status indicator is releasably coupled to the housing of the light curtain, the array of light emitters is substantially parallel to the housing.

The light emitting module may include a longitudinally extending array of light emitters configured such that, when the light curtain status indicator is releasably coupled to the housing of the light curtain, the array of light emitters extends substantially parallel to the housing.

The coupling member may be releasably captured within the longitudinally extending channel such that the light curtain status indicator is slidably adjustable relative to the housing.

The light curtain status indicator may include a cascading electrical port configured to serially electrically connect to other field-installable side mounted devices.

The other field-installable side mounted device may include another light curtain status indicator.

The light curtain status indicator may include a touch input device.

The light curtain status indicator may include a sensor device.

In an illustrative aspect, a status indicator may include a light emitting module (e.g., 305) configured to emit a visual indicium corresponding to a status of at least one predetermined signal. The status indicator may include a coupling member (e.g., 230) configured to be releasably captured within a longitudinally extending channel (e.g., 235) of a housing of a light curtain, such that the light curtain status indicator is disposed on a side of and substantially parallel to the housing. The light emitting module may emit the visual indicium in an emitting plane (e.g., 314) intersecting an optical axis (e.g., 312) of the light curtain.

When the status indicator is releasably coupled to the housing, the emitting plane may be oriented at an angle $\alpha$ relative to a plane tangential to a mounting surface of the light curtain housing, and $\alpha<90°$, such that the light emitting module is viewable from a wide viewing angle.

The light emitting module may include a longitudinally extending array of light emitters configured such that, when the status indicator is releasably coupled to the housing of the light curtain, the array of light emitters is substantially parallel to the housing.

The light emitting module may include a longitudinally extending array of light emitters configured such that, when the status indicator is releasably coupled to the housing of the light curtain, the array of light emitters extends substantially parallel to the housing.

The coupling member may be releasably captured within the longitudinally extending channel such that the status indicator is slidably adjustable relative to the housing.

The status indicator may include a cascading electrical port configured to serially electrically connect to other field-installable side mounted devices.

The other field-installable side mounted device may include another status indicator.

The status indicator may include a touch input device.

The status indicator may include a sensor device.

The light emitting module may include a refractive cover such that the visual indicium has a viewing angle of at least 180°.

In an illustrative aspect, a safety system may include a light curtain (e.g., 110) configured to detect an approaching object towards a manufacturing area. The safety system may include at least one status indicator (e.g., 120) configured to be releasably coupled to the light curtain. The status indicator may include a light emitting module (e.g., 305). The light emitting module may include a refractive cover (e.g., 225), configured to emit a visual indicium (e.g., 125) corresponding to a status of the light curtain. The status indicator may include a coupling member (e.g., 230) configured to be releasably captured within a longitudinally extending channel (e.g., 235) of a housing of the light curtain, such that the at least one status indicator is disposed on a side of and substantially parallel to the housing. The light emitting module may emit the visual indicium in an emitting plane intersecting an optical axis of the light curtain. When the light curtain status indicator is releasably coupled to the housing, the emitting plane may be oriented at an angle α relative to a plane tangential to a mounting surface of the light curtain housing, and α<90°, such that the light emitting module is viewable from a viewing angle at least 180°.

When two status indicators are releasably coupled to the light curtain, the visual indicium emitted by the status indicators may be visible substantially 360° around the housing of the light curtain.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A light curtain status indicator, comprising:
a light emitting module comprising a refractive cover and configured to emit a visual indicium at a wide angle corresponding to a status of at least one predetermined signal; and,
a coupling member configured to be releasably captured within a longitudinally extending channel of a housing of a light curtain, such that the light curtain status indicator is disposed on a side of and substantially parallel to the housing, wherein the light emitting module emits the visual indicium in an emitting plane intersecting an optical axis of the light curtain, and,
when the light curtain status indicator is releasably coupled to the housing, the emitting plane is oriented at an angle α relative to a plane tangential to a mounting surface of the light curtain housing, and α<90°, such that the light emitting module is viewable from at least a 180° viewing angle.

2. The light curtain status indicator of claim 1, wherein the light emitting module comprises a longitudinally extending array of light emitters configured such that, when the light curtain status indicator is releasably coupled to the housing of the light curtain, the array of light emitters is substantially parallel to the housing.

3. The light curtain status indicator of claim 1, wherein the light emitting module comprises a longitudinally extending array of light emitters configured such that, when the light curtain status indicator is releasably coupled to the housing of the light curtain, the array of light emitters extends substantially parallel to the housing.

4. The light curtain status indicator of claim 1, wherein the coupling member is releasably captured within the longitudinally extending channel such that the light curtain status indicator is slidably adjustable relative to the housing.

5. The light curtain status indicator of claim 1, further comprising a cascading electrical port configured to serially electrically connect to other field-installable side mounted devices.

6. The light curtain status indicator of claim 5, wherein the other field-installable side mounted device comprises another light curtain status indicator.

7. The light curtain status indicator of claim 1, further comprising a touch input device.

8. The light curtain status indicator of claim 1, further comprising a sensor device.

9. A status indicator, comprising:
a light emitting module configured to emit a visual indicium corresponding to a status of at least one predetermined signal; and,
a coupling member configured to be releasably captured within a longitudinally extending channel of a housing of a light curtain, such that the light curtain status indicator is disposed on a side of and substantially parallel to the housing,
wherein the light emitting module emits the visual indicium in an emitting plane intersecting an optical axis of the light curtain.

10. The status indicator of claim 9, wherein:
when the status indicator is releasably coupled to the housing, the emitting plane is oriented at an angle α relative to a plane tangential to a mounting surface of the light curtain housing, and α<90°, such that the light emitting module is viewable from a wide viewing angle.

11. The status indicator of claim 9, wherein the light emitting module comprises a longitudinally extending array of light emitters configured such that, when the status indicator is releasably coupled to the housing of the light curtain, the array of light emitters is substantially parallel to the housing.

12. The status indicator of claim 9, wherein the light emitting module comprises a longitudinally extending array of light emitters configured such that, when the status indicator is releasably coupled to the housing of the light curtain, the array of light emitters extends substantially parallel to the housing.

13. The status indicator of claim 9, wherein the coupling member is releasably captured within the longitudinally extending channel such that, the status indicator is slidably adjustable relative to the housing.

14. The status indicator of claim 9, further comprising a cascading electrical port configured to serially electrically connect to other field-installable side mounted devices.

15. The status indicator of claim 14, wherein the other field-installable side mounted device comprises another status indicator.

16. The status indicator of claim 9, further comprising a touch input device.

17. The status indicator of claim 9, further comprising a sensor device.

18. The status indicator of claim 9, wherein the light emitting module further comprises a refractive cover such that the visual indicium has a viewing angle of at least 180°.

19. A safety system comprising:
a light curtain configured to detect an approaching object towards a manufacturing area; and,
at least one status indicator configured to be releasably coupled to the light curtain, comprising:
- a light emitting module comprising a refractive cover, configured to emit a visual indicium corresponding to a status of the light curtain; and,
- a coupling member configured to be releasably captured within a longitudinally extending channel of a housing of the light curtain, such that the at least one status indicator is disposed on a side of and substantially parallel to the housing,
- wherein the light emitting module emits the visual indicium in an emitting plane intersecting an optical axis of the light curtain, and,
- when the light curtain status indicator is releasably coupled to the housing, the emitting plane is oriented at an angle $\alpha$ relative to a plane tangential to a mounting surface of the light curtain housing, and $\alpha<90°$, such that the light emitting module is viewable from a viewing angle at least 180°.

20. The safety system of claim 19, wherein when two status indicators are releasably coupled to the light curtain, the visual indicium emitted by the status indicators are visible substantially 360° around the housing of the light curtain.

\* \* \* \* \*